(12) United States Patent
Tamura (10) Patent No.: US 11,468,287 B2
(45) Date of Patent: Oct. 11, 2022

(54) INFORMATION PROCESSING SYSTEM, INFORMATION PROCESSING APPARATUS, AND INFORMATION PROCESSING METHOD

(71) Applicant: FUJITSU LIMITED, Kawasaki (JP)

(72) Inventor: Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 580 days.

(21) Appl. No.: 16/518,103

(22) Filed: Jul. 22, 2019

(65) Prior Publication Data

US 2020/0050921 A1 Feb. 13, 2020

(30) Foreign Application Priority Data

Aug. 10, 2018 (JP) .............................. JP2018-151808

(51) Int. Cl.
*G06N 3/04* (2006.01)
*G06N 3/063* (2006.01)

(52) U.S. Cl.
CPC ........... *G06N 3/0445* (2013.01); *G06N 3/063* (2013.01)

(58) Field of Classification Search
CPC .... G06N 3/0445; G06N 3/0472; G06N 3/063; G06N 3/088
See application file for complete search history.

(56) References Cited

U.S. PATENT DOCUMENTS 5,243,599 A 9/1993 Barrett et al.
2017/0351947 A1* 12/2017 Tamura ................. G06N 3/063

FOREIGN PATENT DOCUMENTS

JP 5-259847 10/1993
JP 2017-219948 12/2017

OTHER PUBLICATIONS

Matsubara et al., "Ising-Model Optimizer with Parallel-Trial Bit-Sieve Engine", July, 5, 2017, Complex, Intelligent, and Software Intensive Systems, Advances in Intelligent Systems and Computing 611, pp. 432-438 (Year: 2017).*
Japanese Platform for Patent Information English abstract for Japanese Patent Publication No. 2017-219948, published Dec. 14, 2017.

(Continued)

*Primary Examiner* — Brent Johnston Hoover
(74) *Attorney, Agent, or Firm* — Staas & Halsey LLP (57) ABSTRACT

Storage devices each hold corresponding one of n weight coefficient groups obtained by dividing weight coefficients such that each group includes weight coefficients about at least two bits. Bit value calculation circuits each output a result (flag information) by determining whether to accept updating about each of the bits based on the weight coefficient group, a value of an updated bit, identification information, and thermal excitation energy and an updated value of an accepted bit whose uprate has been accepted. First selection circuits each select an accepted bit based on the flag information and output a state signal including the flag information, the updated value, and identification information associated with the accepted bit. A second selection circuit determines the updated bit based on the flag information in the state signal and supplies the value of the updated bit and the identification information to each of optimization apparatuses.

5 Claims, 8 Drawing Sheets

(56) References Cited

OTHER PUBLICATIONS

Japanese Platform for Patent Information English abstract for Japanese Patent Publication No. 5-259847, published Oct. 8, 1993.
Satoshi Matsubara et al., "Ising-Model Optimizer with Parallel-Trial Bit-Sieve Engine", Proceedings of the 11$^{th}$ International Conference on Complex, Intelligent, and Software Intensive Systems, Jul. 10-12, 2017, pp. 432-438 with References and Bibliographic Information (2 pp.) and CISIS Conference Information (1 pp.).

* cited by examiner

INFORMATION PROCESSING SYSTEM, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2018-151808, filed on Aug. 10, 2018, the entire contents of which are incorporated herein by reference.

FIELD

The embodiments discussed herein are related to an optimization system and a control method thereof.

BACKGROUND

Neumann computers (von Neumann) are not very suitable for solving multivariable optimization problems. However, to solve these problems, there is a method using an optimization apparatus (which could also be referred to as an Ising machine or a Boltzmann machine) that uses an Ising energy function. The optimization apparatus calculates a calculation target problem by replacing it by an Ising model, which is a model representing the behavior of magnetic spins.

The optimization apparatus is modeled by using a neural network, for example. In this case, an individual one of a plurality of bits corresponding to a plurality of spins included in an Ising model functions as a neuron that outputs 0 or 1 based on the value of another bit and a weight coefficient (also referred to as a coupling coefficient) that indicates the magnitude of the interaction between this individual bit and another bit. For example, the optimization apparatus uses a stochastic search method using simulated annealing and obtains, as a solution, a combination of values of the individual bits that achieves the minimum value of the energy function (hereinafter referred to as an energy) as described above. This energy function is also referred to as a cost function, an objective function, etc.

Conventional optimization apparatuses calculate a combination of values of the individual bits that achieves the minimum energy by using digital circuits and performing simulated annealing.

See, for example, the following documents:
Japanese Laid-open Patent Publication No. 2017-219948;
Japanese Laid-open Patent Publication No. 5-259847; and
Satoshi Matsubara et al., "Ising-Model Optimizer with Parallel-Trial Bit-Sieve Engine", CISIS-2017, Pages 432-438.

However, if the number of bits increases as the problem scale increases, the number of weight coefficients also increases. As a result, conventional optimization apparatuses (for example, one-chip semiconductor integrated circuits) become unable to store all the weight coefficients in their internal storage unit. While the weight coefficients may be stored in a memory outside these optimization apparatuses, reading the weight coefficients from the memory will slow down the calculation speed.

SUMMARY

According to one aspect, there is provided an optimization system including: n (n is an integer of 2 or more) optimization apparatuses; and a second selection circuit, wherein each of the n optimization apparatuses includes: a storage device that holds corresponding one of n weight coefficient groups obtained by dividing a plurality of weight coefficients, each of which indicates a magnitude of an interaction between a pair of bits among all bits corresponding to all spins included in an Ising model obtained by converting a calculation target problem, in such a manner that each of the n weight coefficient groups includes weight coefficients about at least two bits; a bit value calculation circuit that calculates, for each of the at least two bits, an energy change of the Ising model that occurs when one of the at least two bits changes, based on the corresponding one of the n weight coefficient groups, a value of an updated bit that has been updated among all the bits, and first identification information that identifies the updated bit, determines whether to accept updating about each of the at least two bits based on a magnitude relationship between a thermal excitation energy determined based on a random number and a temperature parameter and the energy change, and outputs flag information that indicates a determination result of whether to accept the updating and an updated value of an accepted bit whose update has been accepted among the at least two bits; and a first selection circuit that selects one accepted bit based on the flag information and outputs a state signal that includes the flag information about the one accepted bit selected, the updated value, and second identification information that identifies the one accepted bit selected, wherein each of the n optimization apparatuses outputs the state signal based on the corresponding one of the n weight coefficient groups that differs among the n optimization apparatuses, and wherein the second selection circuit determines the updated bit based on the flag information included in the state signal outputted by the first selection circuit of each of the n optimization apparatuses and supplies the value of the updated bit and the first identification information that identifies the updated bit to the each of the n optimization apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will be described below with reference to the accompanying drawings.

The optimization systems to be described below search the combinations (states) of individual values of a plurality of bits corresponding to a plurality of spins included in an Ising model obtained by converting a calculation target problem for the values of the individual bits obtained when an energy function represents the minimum value (the ground state).

An Ising energy function E(x) is defined by the following formula (1), for example.

$$E(x) = -\sum_{\langle i,j \rangle} W_{ij} x_i x_j - \sum_i b_i x_i \qquad (1)$$

The first term on the right side in formula (1) represents all the combinations of two bits selectable from all the bits included in an Ising model, without missing or redundantly counting any bit. More specifically, the first term represents a sum of products, each of which is a result of multiplication of one bit value (0 or 1), another bit (0 or 1), and a corresponding coupling coefficient. In formula (1), $x_i$ is a variable (also referred to as a state variable) that indicates the value of the i-th bit, and $x_j$ is a variable that indicates the value of the j-th bit. In addition, $W_{ij}$ is a weight coefficient that indicates the magnitude of the interaction between the i-th and j-th bits. In formula (1), $W_{ii}=0$, and in many cases, $W_{ij}=W_{ji}$ (namely, in many cases, a coefficient matrix of weight coefficients is a symmetric matrix).

The second term on the right side in formula (1) represents a sum of products, each of which is a result of multiplication of the bias coefficient of an individual bit and the corresponding bit value. In formula (1), $b_i$ indicates the bias coefficient of the i-th bit.

When the value of the variable $x_i$ changes and results in $1-x_i$, the amount of increase of the variable $x_i$ is represented by $\Delta x_i=(1-x_i)-x_i=1-2x_i$. An energy change $\Delta E_i$ associated with a spin flip (change of the value) of the i-th bit is expressed by the following formula (2).

$$\Delta E_i = E(x)|_{x_i \to 1-x_i} - E(x) = -\Delta x_i \left( \sum_j W_{ij} x_j + b_i \right) = -\Delta x_i h_i \qquad (2)$$

In formula (2), when the variable $x_i$ changes from 1 to 0, $\Delta x_i$ represents $-1$. When the variable $x_i$ changes from 0 to 1, $\Delta x_i$ represents 1. In addition, $h_i$ is called a local field, and the energy change $\Delta E_i$ is obtained by multiplying the local field $h_i$ by the sign ($+1$ or $-1$) based on $\Delta x_i$. The amount of change of the local field $h_i$ when the variable $x_j$ changes from 0 to 1 is $\Delta h_i^{(j)}=+W_{ij}$, and the amount of change of the local field $h_i$ when the variable $x_j$ changes from 1 to 0 is $\Delta h_i^{(j)}=-W_{ij}$. Likewise, the amount of change of the local field $h_j$ when the variable $x_i$ changes is expressed as $\Delta h_j^{(i)}=\Delta x_i W_{ij}=W_{ji}$.

Thus, the processing for updating the local fields $h_j$ (j=1 to N) when the variable $x_i$ changes may be performed in a parallel manner, as expressed by the following formula (3).

$$\begin{array}{ll} h_1, h_2, \ldots, h_N + & \text{CURRENT VALUES} \\ \text{when } x_j \text{ has changed } \underline{\Delta x_j(W_{i1}, W_{i2}, \ldots, W_{iN})} & \\ h_1, h_2, \ldots, h_N & \text{NEXT VALUES} \end{array} \qquad (3)$$

First Embodiment

Figure 1:
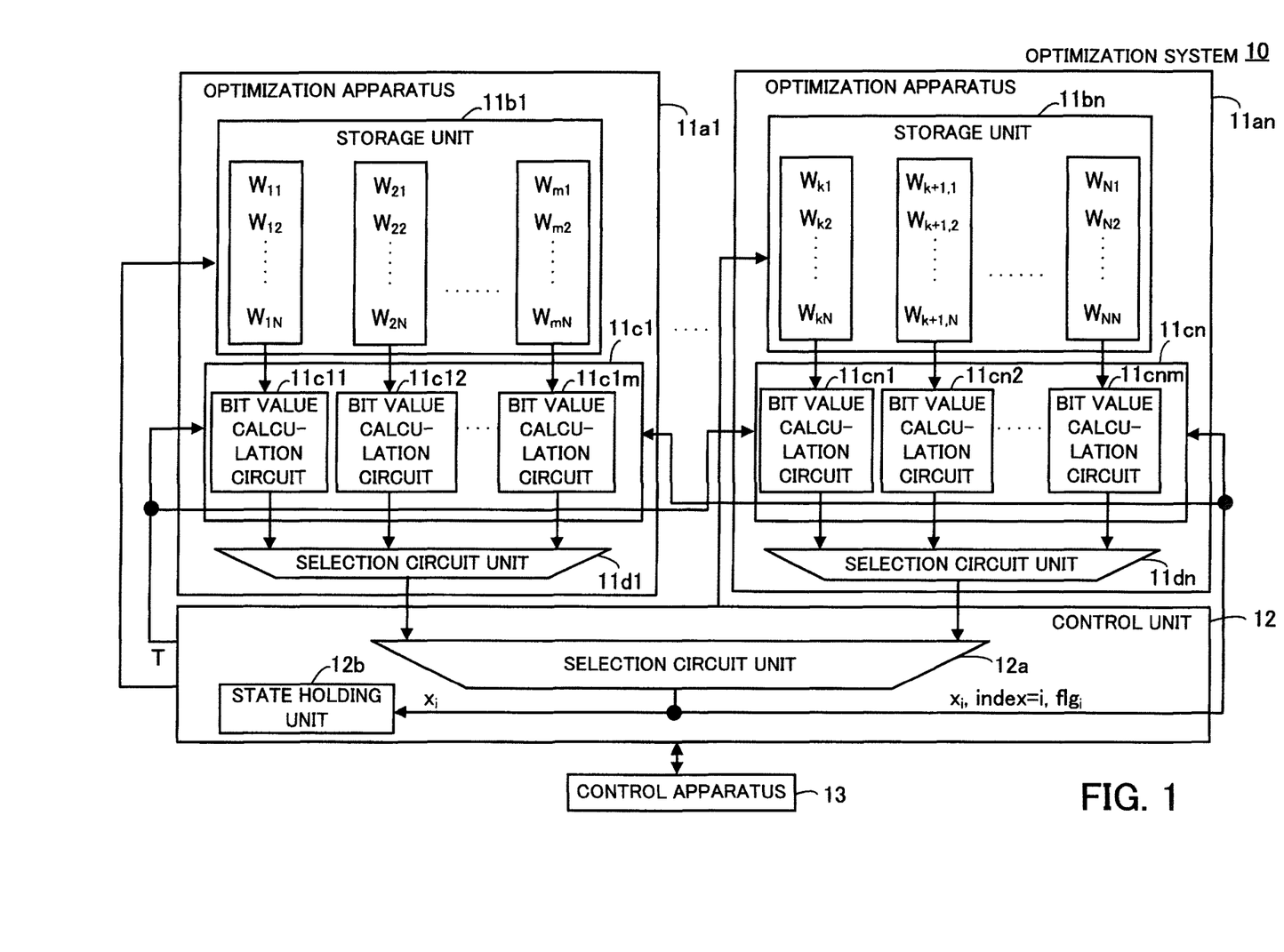
FIG. 1 illustrates an example of an optimization system according to a first embodiment.

FIG. 1 illustrates an example of an optimization system according to a first embodiment.

This optimization system 10 according to the first embodiment includes optimization apparatuses 11a1 to 11an, a control unit 12, and a control apparatus 13.

For example, each of the optimization apparatuses 11a1 to 11an is a one-chip semiconductor integrated circuit (for example, a field programmable gate array (FPGA)).

When the number of all bits is N, the total number of weight coefficients is $N^2$. When the upper limit of the number of weight coefficients storable per chip is W, the number n of chips (the number n of optimization apparatuses) is equal to or more than $N^2/W$ ($n \geq N^2/W$). However, to efficiently use the resources of the individual chips, n may be set to a minimum value that satisfies $n \geq N^2/W$. For example, when N=4,000 and $W=4 \times 10^6$, since $N^2/W=4$, n may be set to 4. In this case, the first chip holds a weight coefficient group about the bits whose identification information (index) is 1 to 1,000, and the second chip holds a weight coefficient group about the bits whose index is 1,001 to 2,000. In addition, the third chip holds a weight coefficient group about the bits whose index is 2,001 to 3,000, and the fourth chip holds a weight coefficient group about the bits whose index is 3,001 to 4,000. An individual one of the chips may hold a weight coefficient group about a different number of bits.

The optimization apparatus 11a1 includes a storage unit 11b1, a bit value calculation circuit unit 11c1, and a selection circuit unit 11d1.

The storage unit 11b1 holds weight coefficient groups about m bits (m is an integer of 2 or more, i.e., the bits whose index is 1 to m) among weight coefficients $W_{11}$ to $W_{NN}$, each of which indicates the magnitude of the interaction between a pair of bits among all the bits corresponding to all the spins included in an Ising model. The weight coefficients $W_{11}$, $W_{12}$, ..., and $W_{1N}$ belong to a weight coefficient group about the bit whose index is 1, the weight coefficients $W_{21}$, $W_{22}$, ..., and $W_{2N}$ belong to a weight coefficient group about the bit whose index is 2. The weight coefficients $W_{m1}$, $W_{m2}$, ..., and $W_{mN}$ belong to a weight coefficient group about the bit whose index is m.

The storage unit 11b1 is, for example, a register or a static random access memory (SRAM).

The bit value calculation circuit unit 11c1 acquires the weight coefficient groups stored in the storage unit 11b1 and receives the value of an updated bit that has been updated among the bits and an index that identifies the updated bit from the control unit 12. Next, based on these data, the bit value calculation circuit unit 11c1 calculates, for each of the m bits, an Ising model energy change that occurs when one of the m bits changes. Next, based on the magnitude relationship between a thermal excitation energy and the energy change calculated for each of the m bits, the bit value calculation circuit unit 11c1 determines whether to accept the updating. Next, the bit value calculation circuit unit 11c1 outputs flag information that indicates a determination result of whether to accept the updating about each of the m bits and the updated value of the bit (accepted bit) whose update has been accepted among the m bits.

The thermal excitation energy is, for example, determined based on a random number generated by a random number generation circuit to be described below and a temperature parameter T supplied by the control unit 12.

In the example in FIG. 1, the bit value calculation circuit unit 11c1 includes m bit value calculation circuits 11c11, 11c12, ..., and 11c1m.

The bit value calculation circuit 11c11 calculates an Ising model energy change that occurs when the bit whose index is 1 changes and determines whether to accept the updating based on the magnitude relationship between the thermal excitation energy and the calculated energy change. Next, the bit value calculation circuit 11c11 outputs flag information and the updated value of this bit (when the updating of the bit whose index is 1 has been accepted). If the bit value calculation circuit 11c11 determines not to accept the updating of the bit whose index is 1, the bit value calculation circuit 11c11 outputs the current value (not updated) of the bit whose index is 1. The bit value calculation circuits 11c12 to 11c1m perform the same processing as that of the bit value calculation circuit 11c11 on the bits whose index is 2 to m.

A circuit example of the bit value calculation circuits 11c11 to 11c1m will be described below.

The selection circuit unit 11d1 selects a single accepted bit based on flag information and outputs a state signal including flag information about the accepted bit selected, the updated value, and identification information that identifies the accepted bit. An example of the selection circuit unit 11d1 will be described below.

Among the optimization apparatuses 11a1 to 11an, the optimization apparatuses other than the optimization apparatus 11a1 have the same elements as those of the optimization apparatus 11a1, and each of these optimization apparatuses outputs a state signal based on a corresponding one of the weight coefficient groups different from each other.

For example, a storage unit 11bn of the optimization apparatus 11an holds weight coefficient groups about the bits whose index is k to N. The weight coefficients $W_{k1}$, $W_{k2}$, . . . , and $W_{kN}$ belong to a weight coefficient group about the bit whose index is k, and the weight coefficient $W_{k+1,1}$, $W_{k+1,2}$, . . . , and $W_{k+1,N}$ belong to a weight coefficient group about the bit whose index is k+1. In addition, the weight coefficient $W_{N1}$, $W_{N2}$, . . . , and $W_{NN}$ belong to a weight coefficient group about the bit whose index is N.

A bit value calculation circuit unit 11cn includes bit value calculation circuits 11cn1, 11cn2, . . . , and 11cnm. The bit value calculation circuit unit 11cn performs the same processing as that of the bit value calculation circuit unit 11c1 and outputs flag information about each of the bits whose index is k to N and the updated value of the accepted bit among the bits whose index is k to N.

The selection circuit unit 11dn selects a single accepted bit based on flag information and outputs a state signal including flag information about the accepted bit selected, the updated value, and identification information that identifies the accepted bit.

The control unit 12 exchanges information with the control apparatus 13 (for example, a personal computer (PC)). For example, the control unit 12 receives weight coefficients and bias coefficients that express an Ising model from the control apparatus 13, stores the weight coefficients in the storage units 11b1 to 11bn, and sets the bias coefficients as the initial values of the local fields calculated by the bit value calculation circuit units 11c1 to 11cn.

In addition, the control unit 12 receives, from the control apparatus 13, annealing conditions (for example, information about the maximum and minimum values of the temperature parameter T and how to drop the value of the temperature parameter T) and sets the temperature parameter T in the bit value calculation circuit units 11c1 to 11cn based on the annealing conditions. The control unit 12 gradually drops the value of the temperature parameter T based on the annealing conditions. For example, when the control unit 12 has dropped the value of the temperature parameter T a predetermined number of times (or when the temperature parameter T has reached the minimum value), the control unit 12 transmits the values of the individual bits held in a state holding unit 12b to the control apparatus 13 as a solution.

In the example of the optimization system 10 in FIG. 1, the control unit 12 includes a selection circuit unit 12a and the state holding unit 12b.

The selection circuit unit 12a receives the state signals from the respective selection circuit units 11d1 to 11dn, determines an updated bit based on the flag information included in the state signals, and supplies the value of the updated bit and the index of the updated bit to each of the optimization apparatuses 11a1 to 11an. In the example in FIG. 1, other than the value (variable $x_i$) of the bit whose index is i and the index i, the selection circuit unit 12a also supplies flag information ($flg_i$) to the bit value calculation circuit units 11c1 to 11cn.

The state holding unit 12b holds the values of the individual bits and updates these values based on the updated value of the bit outputted by the selection circuit unit 12a.

The control unit 12 may be realized by, for example, an electronic circuit for specific use such as an application specific integrated circuit (ASIC) or an FPGA. The control unit 12 may include a processor such as a central processing unit (CPU) or a digital signal processor (DSP). In this case, the processor performs the storage control of the weight coefficients and the control of the temperature parameter T as described above by executing a program stored in a memory not illustrated. In addition, the control apparatus 13 may include the function of setting the weight coefficients and the function of controlling the temperature parameter T.

The selection circuit unit 12a may be realized in a relatively small circuit scale even when the number of optimization apparatuses 11a1 to 11an is increased. Thus, the selection circuit unit 12a may be arranged in any one of the optimization apparatuses 11a1 to 11an. Likewise, the state holding unit 12b may be arranged in any one of the optimization apparatuses 11a1 to 11an. The selection circuit unit 12a or the state holding unit 12b may be arranged independently from the optimization apparatuses 11a1 to 11an and the control unit 12. A control unit arranged in each of the optimization apparatuses 11a1 to 11an may perform the storage control of the weight coefficients or the control of the temperature parameter T.

(Example of Bit Value Calculation Circuit)

Figure 2:
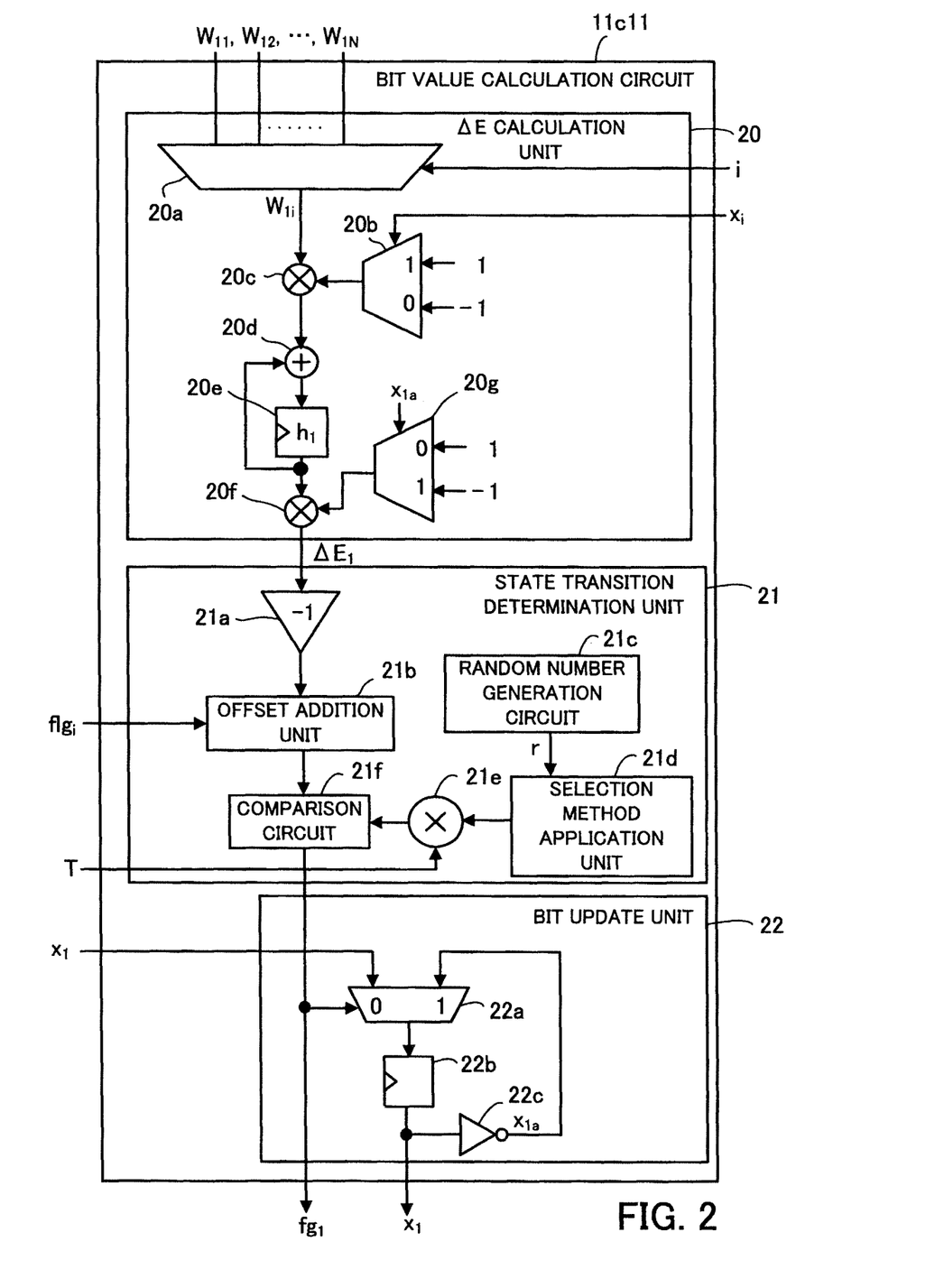
FIG. 2 illustrates an example of a bit value calculation circuit.

FIG. 2 illustrates an example of a bit value calculation circuit. More specifically, FIG. 2 illustrates an example of the bit value calculation circuit 11c11 illustrated in FIG. 1. The other bit value calculation circuits illustrated in FIG. 1 may be realized by the same circuit.

The bit value calculation circuit 11c11 includes a ΔE calculation unit 20, a state transition determination unit 21, and a bit update unit 22.

The ΔE calculation unit 20 includes selection circuits 20a and 20b, a multiplier 20c, an adder 20d, a register 20e, a multiplier 20f, and a selection circuit 20g.

The selection circuit 20a selects one of the weight coefficients $W_{1i}$ (index i is 1 to N) supplied by the selection circuit unit 12a illustrated in FIG. 1 and stored in the storage unit 11b1 and outputs the selected weight coefficient $W_{1i}$.

For example, when N is inputted as the index to the selection circuit 20a, the selection circuit 20a selects the weight coefficient $W_{1N}$.

The selection circuit 20b calculates $\Delta x_i$ in formula (3). As described above, when the variable $x_i$ changes from 1 to 0, $\Delta x_i$ represents −1. In contrast, when the variable $x_i$ changes from 0 to 1, $\Delta x_i$ represents 1. When the variable $x_i$ (the updated value of the bit value whose index is i) supplied by the selection circuit unit 12a is 0, the selection circuit 20b selects and outputs −1. When the variable $x_i$ is 1, the selection circuit 20b selects and outputs 1.

The multiplier 20c outputs a product of the weight coefficient $W_{1i}$ outputted by the selection circuit 20a and the value outputted by the selection circuit 20b.

The adder 20d adds the value outputted by the multiplier 20c and the value stored in the register 20e and outputs the sum.

The register 20e captures the value (local field $h_1$) outputted by the adder 20d in synchronization with a clock signal not illustrated. The register 20e is, for example, a flip-flop. The initial value of the local field $h_1$ stored in the register 20e is a bias coefficient $b_1$.

The multiplier 20f outputs a product of the local field $h_1$ outputted by the register 20e and the value outputted by the selection circuit 20g. This product is an energy change $\Delta E_1$.

The selection circuit 20g calculates $\Delta x_1$. The selection circuit 20g outputs 1 when the variable $x_{1a}$ (the value when the bit whose index is 1 has changed) is 0. In contrast, the selection circuit 20g outputs −1 when the variable $x_{1a}$ is 1.

The state transition determination unit 21 includes a sign inversion unit 21a, an offset addition unit 21b, a random number generation circuit 21c, a selection method application unit 21d, a multiplier 21e, and a comparison circuit 21f.

The sign inversion unit 21a inverts the sign by multiplying the energy change $\Delta E_1$ by −1.

The offset addition unit 21b adds an offset value to the output value ($-\Delta E_1$) of the sign inversion unit 21a. When $flg_i$ supplied by the above selection circuit unit 12a indicates that the state transition will not be accepted (namely, when no state transition occurs), the offset addition unit 21b increases the offset value. In contrast, when $flg_1$ indicates that the state transition will be accepted (namely, when a state transition occurs), the offset addition unit 21b sets the offset value to 0. If the offset value increases, the state transition is accepted more easily. In this way, the current state is able to escape from a local solution more easily.

The random number generation circuit 21c generates a uniform random number r ($0 \leq r \leq 1$).

The selection method application unit 21d outputs a value based on a selection method (a Metropolis method or a Gibbs method) for performing simulated annealing.

When simulated annealing is performed, it has been proved that a state reaches an optimal solution with an infinite time (an infinite number of iterations) if the acceptance probability $A(\Delta E, T)$ of the state transition that causes a certain energy change $\Delta E$ is determined as expressed by the following formula (4).

$$A(\Delta E, T) = f(-\Delta E/T) \quad (4)$$

$$f(-\Delta E/T) = \begin{cases} \min[1, \exp(-\Delta E/T)] & \text{METROPOLIS METHOD} \\ 1/[1 + \exp(\Delta E/T)] & \text{GIBBS METHOD} \end{cases}$$

In formula (4), T represents the above temperature parameter T.

When the acceptance probability $A(\Delta E, T)$ expressed by formula (4) is used and when a steady state is reached after a sufficient number of iterations, the occupation probability of an individual state is in accordance with a Boltzmann distribution at thermal equilibrium in thermodynamics. Since the occupation probability of a lower energy state rises by gradually decreasing a high temperature, when the temperature has sufficiently dropped, a low energy state is supposed to be obtained. Since this behavior resembles state change seen when material is annealed, this method is called simulated annealing. The stochastic occurrence of a state transition that results in an energy rise in simulated annealing corresponds to thermal excitation in physics.

A circuit that outputs flag information (=1), which indicates that a state transition causing an energy change $\Delta E$ is accepted with the acceptance probability $A(\Delta E, T)$, is realized by a comparator that outputs a value based on a result of the comparison between $f(-\Delta E/T)$ in formula (4) and the uniform random number r.

The same function is realized by any of the following variations. The magnitude relationship between two numbers does not change even when the same monotonically increasing function is applied to the two numbers. Thus, even when the same monotonically increasing function is applied to the two input terminals of the comparator, the output of the comparator does not change. For example, an inverse function $f^{-1}(-\Delta E/T)$ of $f(-\Delta E/T)$ may be used as the monotonically increasing function to be applied to $f(-\Delta E/T)$, and $f^{-1}(r)$, which is obtained by replacing $-\Delta E/T$ of $f^{-1}(-\Delta E/T)$ by r, may be used as the monotonically increasing function to be applied to the uniform random number r. In this case, a circuit that outputs 1 when $-\Delta E/T > f^{-1}(r)$ may be used as the circuit having an equivalent function to that of the above comparator. In addition, since the temperature parameter T is positive, the circuit may output 1 when $-\Delta E > T \cdot f^{-1}(r)$.

The selection method application unit 21d outputs the value of $f^{-1}(r)$ by using a conversion table for converting the inputted uniform random number r into the value of the above $f^{-1}(r)$. When the Metropolis method is applied, $f^{-1}(r)$ is log(r). For example, the conversion table is stored in a memory such as a random access memory (RAM) or a flash memory.

The multiplier 21e outputs a product ($T \cdot f^{-1}(r)$) of the temperature parameter T supplied by the control unit and $f^{-1}(r)$. $T \cdot f^{-1}(r)$ corresponds to the thermal excitation energy.

The comparison circuit 21f compares the sum obtained by the offset addition unit 21b with $T \cdot f^{-1}(r)$. If the sum is larger than $T \cdot f^{-1}(r)$, the comparison circuit 21f outputs 1 as $flg_1$. If the sum is equal to or smaller than $T \cdot f^{-1}(r)$, the comparison circuit 21f outputs 0 as $flg_1$.

The bit update unit 22 includes a selection circuit 22a, a register 22b, and an inverter circuit 22c.

When the comparison circuit 21f outputs 0 as $flg_1$, the selection circuit 22a selects and outputs the variable $x_1$ (the current value of the bit whose index is 1). When the comparison circuit 21f outputs 1 as $flg_1$, the selection circuit 22a selects and outputs the output value of the inverter circuit 22c (corresponding to the above variable $x_{1a}$). As the variable $x_1$, for example, the value held in the state holding unit 12b illustrated in FIG. 1 is used.

The register 22b is a flip-flop, for example. The register 22b captures a value outputted by the selection circuit 22a in synchronization with a clock signal not illustrated and outputs the value as the variable $x_1$. For example, the initial value of the value held in the register 22b is an initial value of the variable $x_1$.

The inverter circuit 22c inverts the output value of the register 22b (changes from 0 to 1 or from 1 to 0) and outputs the inverted value. This output value of the inverter circuit 22c may be used as the variable $x_{1a}$, which is a selection signal supplied to the selection circuit 20g of the $\Delta E$ calculation unit 20.

The bit update unit 22 outputs the current variable $x_1$ when the comparison circuit 21f outputs 0 as $flg_1$. In contrast, the bit update unit 22 outputs the updated variable $x_1=x_{1a}$ when the comparison circuit 21f outputs 1 as $flg_1$.

(Examples of Selection Circuit Units)

Figure 3:
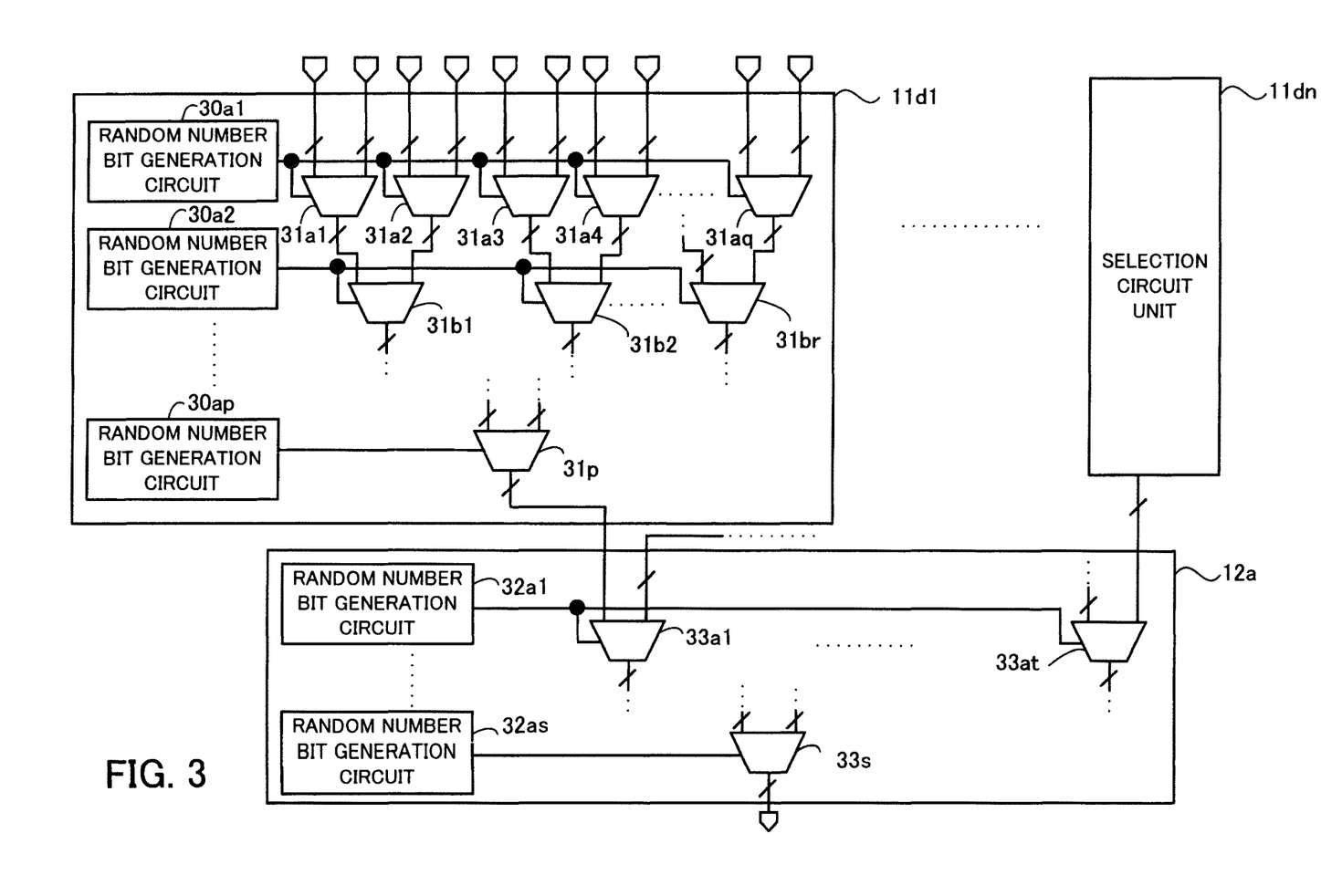
FIG. 3 illustrates examples of selection circuit units.

FIG. 3 illustrates examples of selection circuit units.

The selection circuit unit 11d1 includes random number bit generation circuits 30a1, 30a2, and 30ap and a plurality of selection circuits 31a1 to 31p in a plurality of stages connected in a tree.

Each of the random number bit generation circuits 30a1 to 30ap outputs a 1-bit random number.

Each of the selection circuits 31a1, 31a2, 31a3, 31a4, ..., and 31aq in the first stage receives a pair of variables $x_i$ and a pair of items of flag information $flg_i$ (i=1 to m) outputted by two of the bit value calculation circuits 11c11 to 11c1m. For example, the selection circuit 31a1 receives a set of variable $x_1$ and $flg_1$ outputted by the bit value calculation circuit 11c11 and a set of variable $x_2$ and $flg_2$ outputted by the bit value calculation circuit 11c12. Likewise, the selection circuit 31a2 receives a set of variable $x_3$ and $flg_3$ and a set of variable $x_4$ and $flg_4$, and the selection circuit 31a3 receives a set of variable $x_5$ and $flg_5$ and a set of variable $x_6$ and $flg_6$. In addition, the selection circuit 31a4 receives a set of variable $x_7$ and $flg_7$ and a set of variable $x_8$ and $flg_8$, and the selection circuit 31aq receives a set of variable $x_{m-1}$ and $flg_{m-1}$ and a set of variable $x_m$ and $flg_m$.

Each of the selection circuits 31a1 to 31aq selects a set of variable $x_i$ and $flg_i$ based on the received two sets of variables $x_i$ and $flg_i$ and a 1-bit random number outputted by the random number bit generation circuit 30a1. In addition, each of the selection circuits 31a1 to 31aq generates a 1-bit identification value that indicates the selected set of variable $x_i$ and $flg_i$ and outputs a state signal including the selected variable $x_i$ and $flg_i$ and the identification value. The number of selection circuits 31a1 to 31aq in the first stage is ½ of the number of bit value calculation circuits 11c11 to 11c1m, namely, m/2.

Each of the selection circuits 31b1, 31b2, ..., and 31br in the second stage receives two of the state signals outputted by the selection circuits 31a1 to 31aq. For example, the selection circuit 31b1 receives the state signals outputted by the selection circuits 31a1 and 31a2, and the selection circuit 31b2 receives the state signals outputted by the selection circuits 31a3 and 31a4.

In addition, each of the selection circuits 31b1 to 31br selects one of the two corresponding state signals based on the two state signals and a 1-bit random number outputted by the random number bit generation circuit 30a2. In addition, each of the selection circuits 31b1 to 31br adds, as the most significant bit, a 1-bit value indicating the corresponding selected state signal to the identification value included in the selected state signal and outputs the selected state signal.

The selection circuits in the third and subsequent stages also perform the same processing. Each of the selection circuits in the individual stages adds a bit width of 1 bit to the corresponding identification value, and the selection circuit 31p in the last stage outputs a state signal as the output from the selection circuit unit 11d1.

Among the selection circuit units 11d1 to 11dn, the selection circuit units other than the selection circuit unit 11d1 also have the same circuit configuration.

The selection circuit unit 12a also has the same circuit configuration as that of the selection circuit unit 11d1 and includes random number bit generation circuits 32a1 to 32as, each of which outputs a 1-bit random number, and a plurality of selection circuits 33a1 to 33s in a plurality of stages connected in a tree.

Each of the selection circuits 33a1 to 33at in the first stage receives two of the n state signals outputted by the selection circuit units 11d1 to 11dn. In addition, each of the selection circuits 33a1 to 33at selects one of the two corresponding state signals based on the two state signals and a 1-bit random number outputted by the random number bit generation circuit 32a1. In addition, each of the selection circuits 33a1 to 33at adds, as the most significant bit, a 1-bit value indicating the corresponding selected state signal to the identification value included in the selected state signal and outputs the selected state signal. The number of selection circuits 33a1 to 33at in the first stage is n/2.

The selection circuits in the second and subsequent stages also perform the same processing. Each of the selection circuits in the individual stages adds a bit width of 1 bit to the corresponding identification value, and the selection circuit 33s in the last stage outputs a state signal as the output from the selection circuit unit 12a. The identification value included in the state signal outputted by the selection circuit unit 12a is the index of the updated bit expressed by a binary number.

Figure 4:
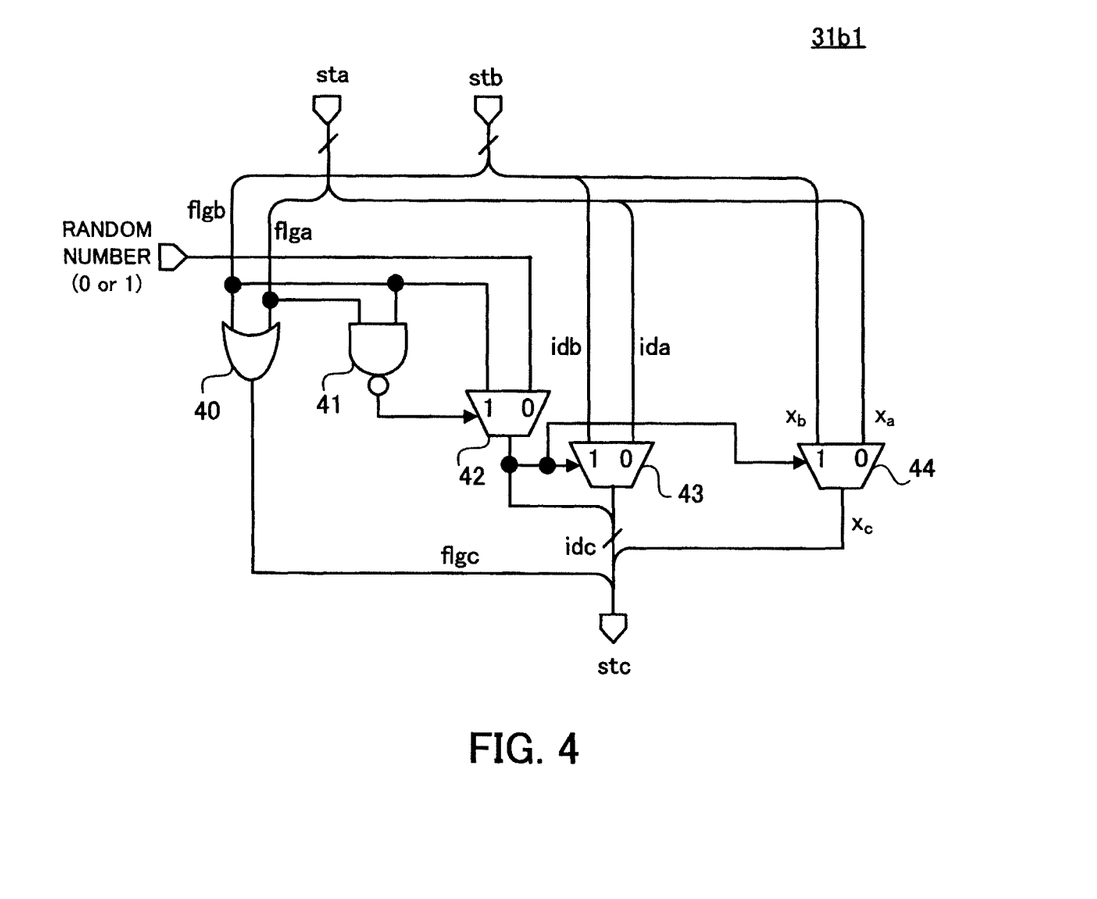
FIG. 4 illustrates an example of a selection circuit.

FIG. 4 illustrates an example of a selection circuit. More specifically, FIG. 4 illustrates an example of the selection circuit 31b1 in FIG. 3.

The selection circuit 31b1 includes an OR circuit 40, a NAND circuit 41, and selection circuits 42 to 44.

The OR circuit 40 receives flag information (flga) included in a state signal sta outputted by the selection circuit 31a1 in the first stage and flag information (flgb) included in a state signal stb outputted by the selection circuit 31a2 in the first stage. The OR circuit 40 outputs 1 if at least one of flga and flgb is 1 and outputs 0 if both of flga and flgb are 0. The output from the OR circuit 40 is flag information (flgc) included in a state signal stc outputted by the selection circuit 31b1.

The NAND circuit 41 receives flga and flgb and outputs a negative AND of flga and flgb.

If the NAND circuit 41 outputs 0, the selection circuit 42 selects and outputs a random number (0 or 1) outputted by the random number bit generation circuit 30a2. If the NAND circuit 41 outputs 1, the selection circuit 42 selects and outputs the value of flgb.

The selection circuit 43 receives an identification value (ida) included in the state signal sta and an identification value (idb) included in the state signal stb. When the selection circuit 42 outputs 0, the selection circuit 43 selects and outputs ida. When the selection circuit 42 outputs 1, the selection circuit 43 selects and outputs idb. A value obtained by adding a 1-bit value 0 or 1 outputted by the selection circuit 42 as the most significant bit to ida or idb outputted by the selection circuit 43 is identification value (idc) included in the state signal stc.

The selection circuit 44 receives a variable $x_a$ included in the state signal sta and a variable $x_b$ included in the state signal stb. When the selection circuit 42 outputs 0, the selection circuit 44 selects and outputs the variable $x_a$. When the selection circuit 42 outputs 1, the selection circuit 44 selects and outputs the variable $x_b$. The variable $x_a$ or variable $x_b$ outputted by the selection circuit 44 is a variable $x_c$ included in the state signal stc.

The selection circuits 31b2 to 31br, the selection circuits in the third and subsequent stages, and the individual selection circuits included in the selection circuit unit 12a illustrated in FIG. 3 may also be realized by the same circuit configuration as that of the selection circuit 31b1.

While the selection circuits 31a1 to 31aq in the first stage in the selection circuit unit 11d1 illustrated in FIG. 3 may also be realized by almost the same circuit configuration as that of the selection circuit 31b1 illustrated in FIG. 4, the selection circuits 31a1 to 31aq do not include the selection circuit 43.

While the above description has been made by using an example in which an index is generated by the selection circuit units 11d1 to 11dn and 12a, the embodiment is not limited to this example. For example, when each of the bit value calculation circuits 11c11 to 11cnm includes a storage unit (for example, a register) holding an index, each of the selection circuit units 11d1 to 11dn reads indexes from these storage units. In this case, for example, each of the plurality of selection circuits included in the selection circuit units 11d1 to 11dn and 12a generates idc without adding a 1-bit value to the output of the corresponding selection circuit 43 as illustrated in FIG. 4. In addition, each of ida and idb represents an index of a different bit, and idc represents one of the indexes of these different bits.

Hereinafter, an example of an operation in the optimization system 10 according to the first embodiment will be described.

Figure 5:
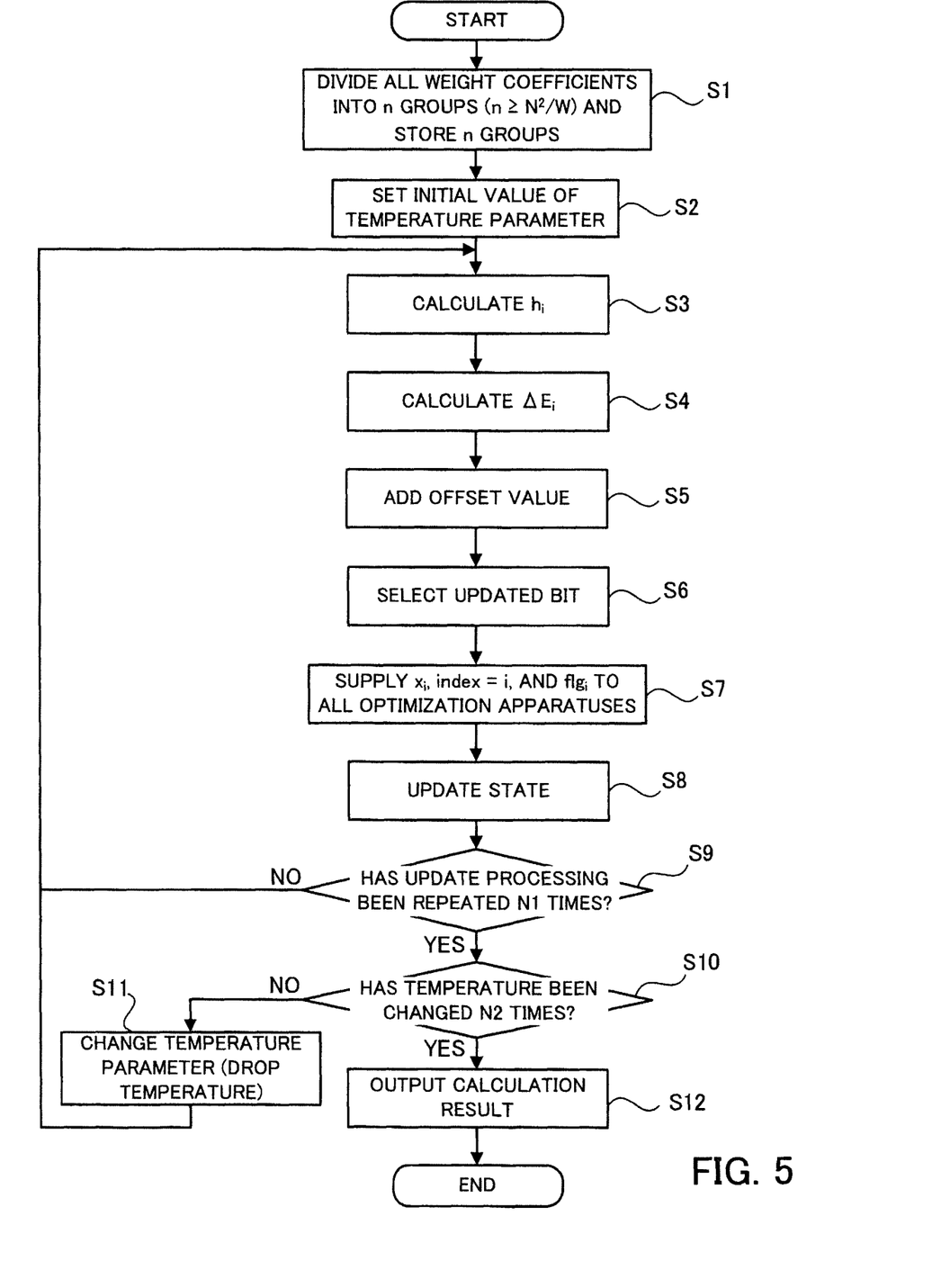
FIG. 5 is a flowchart illustrating an example of an operation in the optimization system according to the first embodiment

FIG. 5 is a flowchart illustrating an example of an operation in the optimization system according to the first embodiment.

First, the control unit 12 divides all the weight coefficients received from the control apparatus 13 into n weight coefficient groups (n≥$N^2$/W) as described above and stores the n weight coefficient groups in the storage units 11b1 to 11bn of the optimization apparatuses 11a1 to 11an (step S1).

In addition, based on the annealing conditions received from the control apparatus 13, the control unit 12 sets an initial value of the temperature parameter T in the bit value calculation circuit units 11c1 to 11cn (step S2). The control unit 12 may set a bias coefficient received from the control apparatus 13 in the bit value calculation circuit units 11c1 to 11cn.

Each of the bit value calculation circuits 11c11 to 11cnm calculates a local field $h_i$ (step S3) and an energy change $\Delta E_i$ (step S4) in accordance with the above method.

Next, each of the bit value calculation circuits 11c11 to 11cnm adds an offset value to a value obtained by inverting the sign of the calculated energy change $\Delta E_i$ (step S5).

Next, the bit value calculation circuits 11c11 to 11cnm and the selection circuit units 11d1 to 11dn and 12a perform the above processing to select an updated bit (step S6).

Next, the selection circuit unit 12a supplies the value of the updated bit (variable $x_i$), the index (=i) of the updated bit, and $flg_i$ to all the optimization apparatuses (the optimization apparatuses 11a1 to 11an) (step S7).

Next, the state holding unit 12b updates the state, which is the storage content thereof, by the variable $x_i$ outputted by the selection circuit unit 12a (step S8).

The control unit 12 determines whether the update processing in steps S3 to S8 has been repeated a predetermined number N1 of times (step S9). If the update processing has not been repeated the predetermined number N1 of times, the update processing in steps S3 to S8 is repeated.

If the update processing has been repeated the predetermined number N1 of times, the control unit 12 determines whether the temperature parameter has been changed N2 times (whether the number of times that the temperature has been changed has reached a predetermined number N2) (step S10).

If the temperature has not been changed N2 times, the control unit 12 changes the temperature parameter (drops the temperature) (step S11). The predetermined numbers N1 and N2 and how the value of the temperature parameter is changed (for example, to what degree the value is dropped at once) are determined based on the annealing conditions. After step S11, the processing is repeated from step S3.

If the temperature has been changed N2 times, the control unit 12 transmits (outputs) the state held in the state holding unit 12b at this point to the control apparatus 13 as a solution (a calculation result) (step S12).

In the optimization system 10 according to the first embodiment, the weight coefficients of all the bits are held in the optimization apparatuses 11a1 to 11an in a distributed manner. The selection circuit unit 12a selects an updated bit from the accept bits determined by the optimization apparatuses 11a1 to 11an by using the held weight coefficients and supplies the value of the updated bit and the corresponding index to the optimization apparatuses 11a1 to 11an. Consequently, even when the optimization system 10 calculates a large-scale problem involving a larger number of bits, the optimization system 10 does not need to read a part of the weight coefficients from an external memory (for example, a memory in the control apparatus 13). Thus, since the optimization system 10 performs less memory access, reduction in calculation speed is prevented. In addition, since the optimization apparatuses do not need to exchange their respective weight coefficients, reduction in calculation speed due to communication between optimization apparatuses is prevented.

Second Embodiment

Figure 6:
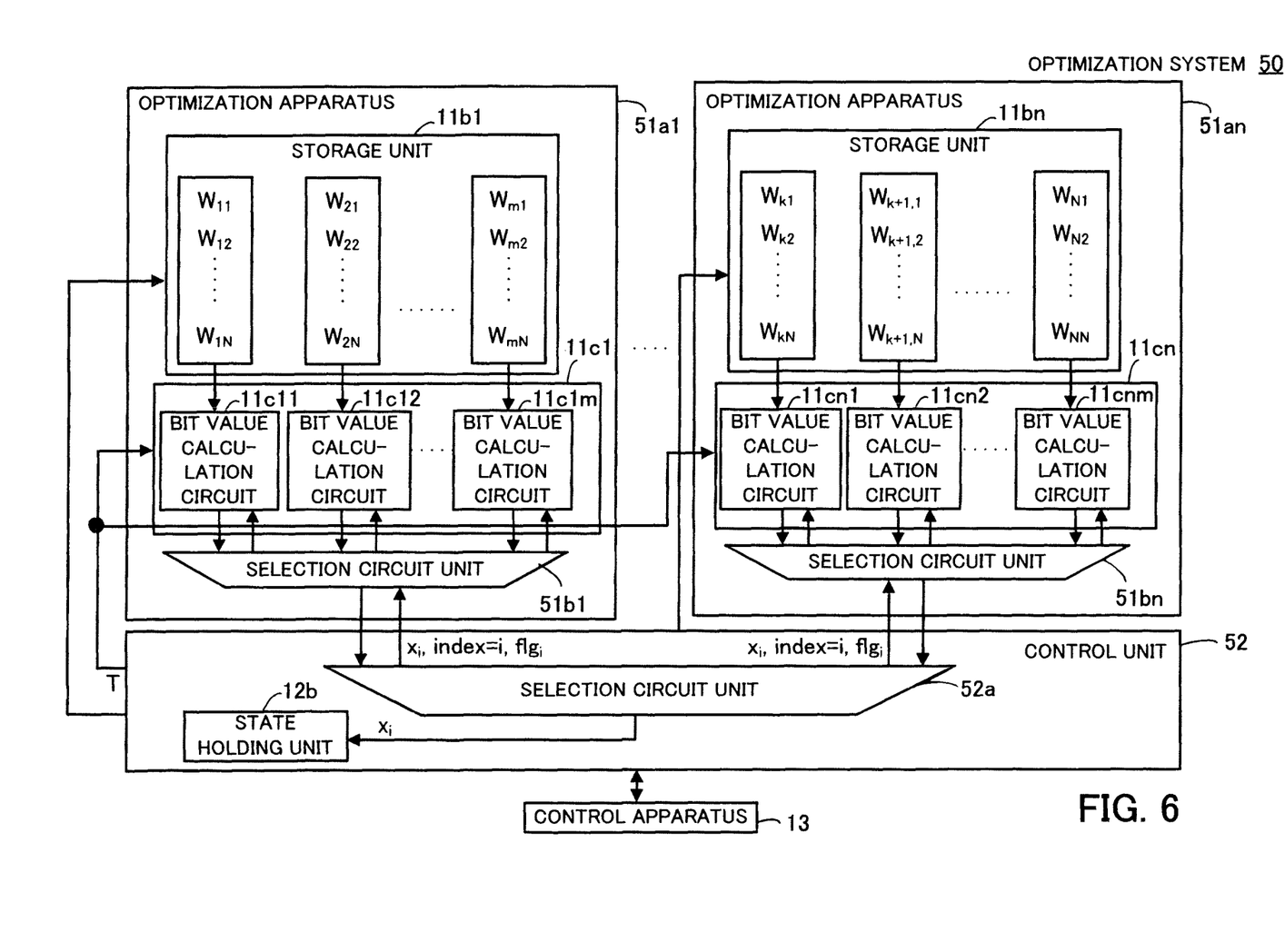
FIG. 6 illustrates an example of an optimization system according to a second embodiment.

FIG. 6 illustrates an example of an optimization system according to a second embodiment. The elements in FIG. 6 that are the same as those in FIG. 1 will be denoted by the same reference characters.

In this optimization system 50 according to the second embodiment, selection circuit units 51b1 to 51bn included in optimization apparatuses 51a1 to 51an and a selection circuit unit 52a included in a control unit 52 include bidirectional paths. The selection circuit unit 52a may be included in one of the optimization apparatuses 51a1 to 51an. Alternatively, the selection circuit unit 52a may be arranged independently from the optimization apparatuses 51a1 to 51an and the control unit 52.

As is the case with the selection circuit unit 12a of the optimization system 10 according to the first embodiment, the selection circuit unit 52a according to the second embodiment supplies the value of the updated bit (variable $x_i$), index=i, and $flg_i$ to the optimization apparatuses 51a1 to 51an. However, the selection circuit unit 52a supplies the variable $x_i$ index=i, and $flg_i$ to the optimization apparatuses 51a1 to 51an by using the paths arranged in the selection circuit unit 52a.

The selection circuit units 51b1 to 51bn have the same functions as those of the selection circuit units 11d1 to 11dn and receive the variable $x_i$, index=i, and $flg_i$ from the selection circuit unit 52a. Next, the selection circuit units 51b1 to 51bn supply these data to their respective bit value calculation circuit units 11c1 to 11cn by using the paths arranged in the selection circuit units 51b1 to 51bn.

For example, the selection circuit unit 51b1 supplies the variable $x_i$ index=i, and $flg_i$ received from the selection circuit unit 52a to each of the bit value calculation circuits 11c11 to 11c1m, by using the paths arranged in the selection circuit unit 51b1.

The overall operation of the optimization system 50 according to the second embodiment is the same as that of the optimization system 10 according to the first embodiment illustrated in FIG. 5.

In the optimization system 50 according to the second embodiment, the variable $x_i$, index=i, and $flg_i$ are supplied to bit value calculation circuit units 11c1 to 11cn by using the paths arranged in the selection circuit unit 51b1 to 51bn and the selection circuit unit 52a. In this way, the optimization system 50 uses less wiring resources than those of the optimization system 10 according to the first embodiment in which the selection circuit unit 12a broadcasts the variable $x_i$, index=i, and $flg_i$ to the bit value calculation circuit units 11c1 to 11cn.

The other advantageous effects of the optimization system 50 according to the second embodiment are the same as those of the optimization system 10 according to the first embodiment.

In the optimization systems 10 and 50 according to the above first and second embodiments, the functions of the control units 12 and 52 for the storage control of the weight coefficients and the control of the temperature parameter T may be realized by causing a processor in the control apparatus such as a PC to execute a control program, for example.

Figure 7:
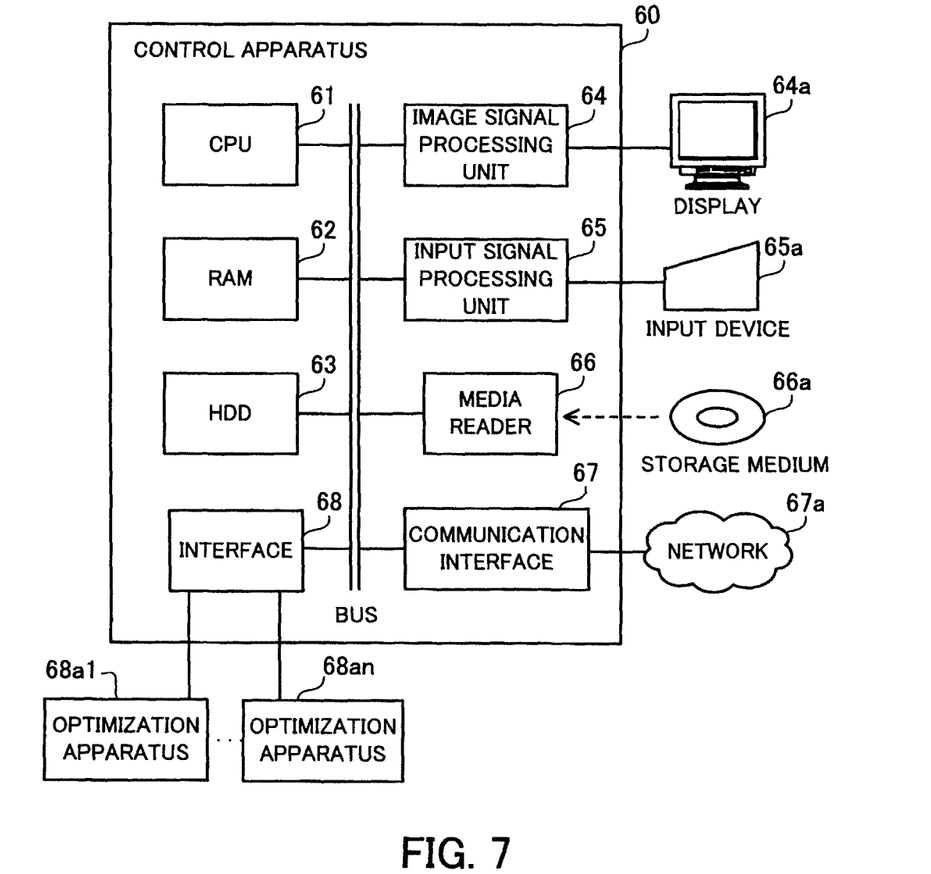
FIG. 7 illustrates a hardware example of a control apparatus.

FIG. 7 illustrates a hardware example of a control apparatus.

A control apparatus 60 includes a CPU 61, a RAM 62, a hard disk drive (HDD) 63, an image signal processing unit 64, an input signal processing unit 65, a media reader 66, a communication interface 67, and an interface 68, which are connected to a bus.

The CPU 61 is a processor including an arithmetic circuit that executes commands of a program. The CPU 61 loads at least a part of a program (for example, the above control program) or data stored in the HDD 63 to the RAM 62 and executes the program. The CPU 61 may include a plurality of processor cores, and the control apparatus 60 may include a plurality of processors. The above processing may be performed in parallel by using a plurality of processors or processor cores.

The RAM 62 is a volatile semiconductor memory that temporarily holds the program executed by the CPU 61 or data used by the CPU 61 for an arithmetic operation. The control apparatus 60 may include a different kind of memory other than a RAM or may include a plurality of memories.

The HDD 63 is a non-volatile storage device that holds a software program such as an operating system (OS), middleware, or application software and data. The program includes, for example, a control program that causes the control apparatus 60 to perform storage control on the weight coefficients or control on the temperature parameter T. The control apparatus 60 may include a different kind of storage device such as a flash memory or a solid state drive (SSD) or a plurality of non-volatile storage devices.

In accordance with a command from the CPU 61, the image signal processing unit 64 outputs an image (for example, an image that indicates a calculation result of an optimization problem) to a display 64a connected to the control apparatus 60. Examples of the display 64a include a cathode ray tube (CRT) display, a liquid crystal display (LCD), a plasma display panel (PDP), and an organic electro-luminescence (OEL).

The input signal processing unit 65 acquires an input signal from an input device 65a connected to the control apparatus 60 and outputs a signal to the CPU 61. Examples of the input device 65a includes a pointing device, a keyboard, a remote controller, and a button switch such as a mouse, a touch panel, a touchpad, and a trackball. Alternatively, a plurality of kinds of input device may be connected to the control apparatus 60.

The media reader 66 is a reading device that reads a program or data stored in a storage medium 66a. Examples of the storage medium 66a include a magnetic disk, an optical disc, a magneto-optical disk (MO), and a semiconductor memory. Examples of the magnetic disk include a flexible disk (FD) and an HDD, and examples of the optical disc include a compact disc (CD) and a digital versatile disc (DVD).

For example, the media redder 66 copies the program or data read from the storage medium 66a to another storage medium such as the RAM 62 or the HDD 63. The read program is executed by, for example, the CPU 61. The storage medium 66a may be a portable storage medium and used to distribute the program or data. The storage medium 66a and the HDD 63 may be referred to as computer-readable storage media.

The communication interface 67 is an interface that is connected to a network 67a and communicates with another information processing apparatus via the network 67a. The communication interface 67 may be a wired communication interface connected to a communication apparatus such as a switch via a cable or a wireless communication interface connected to a base station via a wireless link.

The interface 68 is an interface that communicates with optimization apparatuses 68a1 to 68an. The optimization apparatuses 68a1 to 68an are, for example, the optimization apparatuses 11a1 to 11an illustrated in FIG. 1 or the optimization apparatuses 51a1 to 51an illustrated in FIG. 6.

Figure 8:
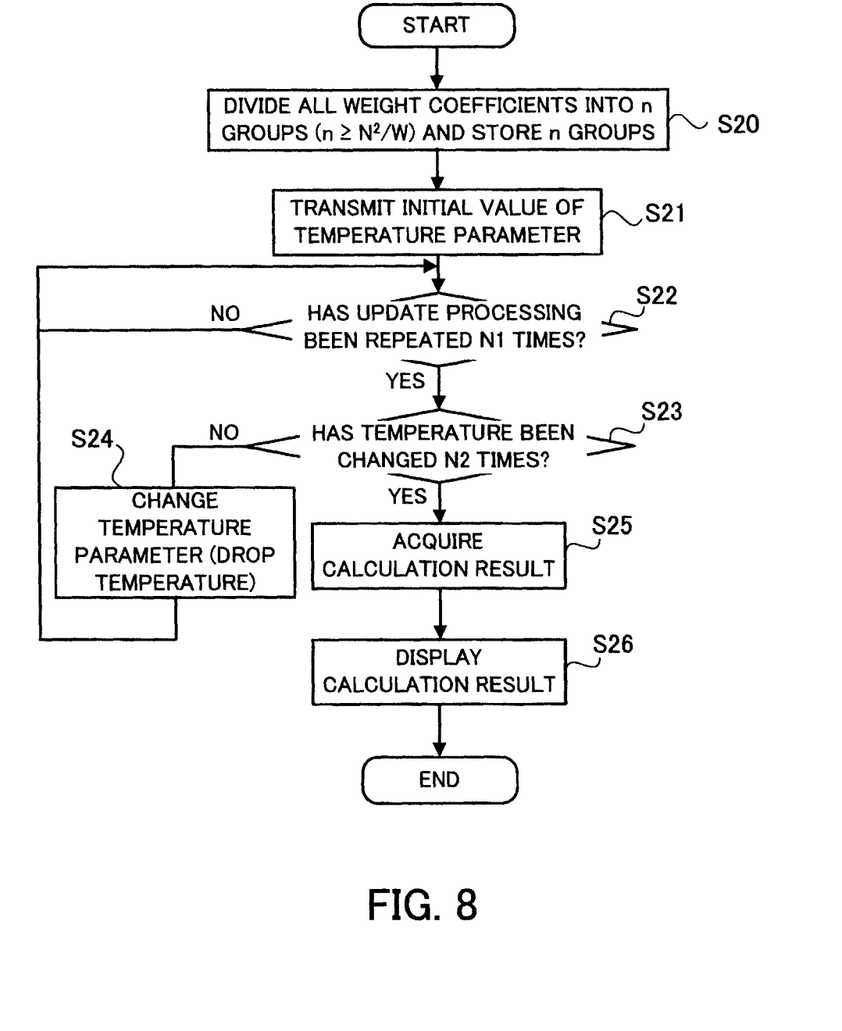
FIG. 8 is a flowchart illustrating an optimization system control method performed by the control apparatus.

FIG. 8 is a flowchart illustrating an optimization system control method performed by the control apparatus 60.

The control apparatus 60 divides all the weight coefficients into n weight coefficient groups (n≥$N^2$/W) as described above and stores the n weight coefficient groups in their respective storage units of the optimization apparatuses 68a1 to 68an (step S20).

In addition, the control apparatus 60 transmits an initial value of the temperature parameter T to the optimization apparatuses 68a1 to 68an (step S21).

Next, for example, the control apparatus 60 receives a signal transmitted every time the optimization apparatuses 68a1 to 68an perform the above update processing and determines whether the update processing has been repeated a predetermined number N1 of time (step S22). If the update processing has not been repeated the predetermined number N1 of times, step S22 is repeated.

If the update processing has been repeated the predetermined number N1 of times, the control apparatus 60 determines whether the temperature parameter T has been changed N2 times (whether the number of times that the temperature has been changed has reached a predetermined number N2) (step S23).

If the temperature has not been changed N2 times, the control apparatus 60 changes the temperature parameter T (drops the temperature) (step S24). In step S24, the control apparatus 60 transmits a value smaller than the previously transmitted value as the temperature parameter T to the optimization apparatuses 68a1 to 68an. The predetermined numbers N1 and N2 and how the value of the temperature parameter is changed (for example, to what degree the value is dropped at once) are determined based on the annealing conditions. After step S24, the processing is repeated from step S22.

If the temperature has been changed N2 times, the control apparatus 60 acquires the values of the individual bits at that point (the variables $x_i$ (i=1 to N)) from, for example, the state holding unit 12b illustrated in FIG. 1 as the calculation result of the optimization problem (step S25).

Next, the control apparatus 60 displays the received calculation result on, for example, the display 64a illustrated in FIG. 7 (step S26) and ends the control of the optimization system.

As described above, the processing contents of the above control apparatus 60 may be realized by causing a computer to execute a program.

The program may be stored in a computer-readable storage medium (for example, the storage medium 66a). Examples of the storage medium include a magnetic disk, an optical disc, a magneto-optical disk, and a semiconductor memory. Examples of the magnetic disk include an FD and an HDD, and examples of the optical disc include a CD, a CD-R (recordable)/RW (rewritable), a DVD, and a DVD-R/RW. The program may be stored in a portable storage medium and distributed. In this case, the program may be copied from the portable storage medium to another storage medium (for example, the HDD 63) and executed.

While an aspect of the optimization system, the optimization system control method, and the optimization system control program has been described based on the above embodiments, this is only an example. The embodiments are not limited to the above description.

In one aspect, reduction in calculation speed is prevented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization system comprising:
   n (n is an integer of 2 or more) optimization apparatuses; and
   a second selection circuit,
   wherein each of the n optimization apparatuses includes:
   a storage device that holds corresponding one of n weight coefficient groups obtained by dividing a plurality of weight coefficients, each of which indicates a magnitude of an interaction between a pair of bits among all bits corresponding to all spins included in an Ising model obtained by converting a calculation target problem, in such a manner that each of the n weight coefficient groups includes weight coefficients of at least two bits;
   a bit value calculation circuit that calculates, for each of the at least two bits, an energy change of the Ising model that occurs when one of the at least two bits changes, based on the corresponding one of the n weight coefficient groups, a value of an updated bit that has been updated among all the bits, and first identification information that identifies the updated bit, determines whether to accept updating about each of the at least two bits based on a magnitude relationship between a thermal excitation energy determined based on a random number and a temperature parameter and the energy change, and outputs flag information that indicates a determination result of whether to accept the updating and an updated value of an accepted bit whose update has been accepted among the at least two bits; and
   a first selection circuit that selects one accepted bit based on the flag information and outputs a state signal that includes the flag information about the one accepted bit selected, the updated value, and second identification information that identifies the one accepted bit selected,
   wherein each of the n optimization apparatuses outputs the state signal based on the corresponding one of the n weight coefficient groups that differs among the n optimization apparatuses, and
   wherein an output terminal of the first selection circuit of each of the n optimization apparatuses is connected to any of plurality of input terminals of the second selection circuit and the second selection circuit determines the updated bit based on the flag information included in the state signal outputted by the first selection circuit of each of the n optimization apparatuses and supplies the value of the updated bit and the first identification information that identifies the updated bit to the each of the n optimization apparatuses.

2. The optimization system according to claim 1,
   wherein the n is equal to or more than a number obtained by dividing a square of a number of all the bits by an upper limit of a number of weight coefficients storable by the storage device of each of the n optimization apparatuses, and
   wherein the storage device of each of the n optimization apparatuses holds the corresponding one of the n weight coefficient groups each including the weight coefficients of a number of bits, the number being obtained by dividing the number of all the bits by the n.

3. The optimization system according to claim 1,
   wherein the second selection circuit supplies the value of the updated bit and the first identification information to the first selection circuit of the each of the n optimization apparatuses via a first path arranged in the second selection circuit, and
   wherein the first selection circuit of the each of the n optimization apparatuses supplies the value of the updated bit and the first identification information supplied by the second selection circuit to the bit value calculation circuit included in the each of the n optimization apparatuses via a second path arranged in the first selection circuit of the each of the n optimization apparatuses.

4. An optimization system control method comprising:
   dividing, by a control apparatus, a plurality of weight coefficients into n (n is an integer of 2 or more) weight coefficient groups in such a manner that each of the n weight coefficient groups includes weight coefficients of at least two bits and storing corresponding one of the n weight coefficient groups in a storage device of each of n optimization apparatuses different from each other in an optimization system, the plurality of weight coefficients each indicating a magnitude of an interaction between a pair of bits among all bits corresponding to all spins included in an Ising model obtained by converting a calculation target problem; and
   controlling, by the control apparatus, size of a temperature parameter on the optimization system,
   wherein the optimization system includes the n optimization apparatuses and a second selection circuit,
   wherein each of the n optimization apparatuses includes:
   the storage device that holds the corresponding one of the n weight coefficient groups obtained by dividing the plurality of weight coefficients; a bit value calculation circuit that calculates, for each of the at least two bits, an energy change of the Ising model that occurs when one of the at least two bits changes, based on the corresponding one of the n weight coefficient groups, a value of an updated bit that has been updated among all the bits, and first identification information that identifies the updated bit, determines whether to accept updating about each of the at least two bits based on a magnitude relationship between a thermal excitation energy determined based on a random number and the temperature parameter and the energy change, and outputs flag information that indicates a determination result of whether to accept the updating and an updated value of an accepted bit whose update has been accepted among the at least two bits; and a first selection circuit that selects one accepted bit based on the flag information and outputs a state signal that includes the flag information about the one accepted bit selected, the updated value, and second identification information that identifies the one accepted bit selected, wherein each of the n optimization apparatuses outputs the state signal based on the corresponding one of the n weight coefficient groups that differs among the n optimization apparatuses, and wherein an output terminal of the first selection circuit of each of the n optimization apparatuses is connected to any of plurality of input terminals of the second selection circuit and the second selection circuit determines the updated bit based on the flag information included in the state signal outputted by the first selection circuit of each of the n optimization apparatuses and supplies the value of the updated bit and the first identification information that identifies the updated bit to the each of the n optimization apparatuses.

5. A non-transitory computer-readable storage medium storing therein an optimization system controlling program that causes a computer to execute a process comprising:

dividing a plurality of weight coefficients into n (n is an integer of 2 or more) weight coefficient groups in such a manner that each of the n weight coefficient groups includes weight coefficients of at least two bits and storing corresponding one of the n weight coefficient groups in a storage device of each of n optimization apparatuses different from each other in an optimization system, the plurality of weight coefficients each indicating a magnitude of an interaction between a pair of bits among all bits corresponding to all spins included in an Ising model obtained by converting a calculation target problem; and controlling size of a temperature parameter on the optimization system, wherein the optimization system includes the n optimization apparatuses and a second selection circuit, wherein each of the n optimization apparatuses includes:
the storage device that holds the corresponding one of the n weight coefficient groups obtained by dividing the plurality of weight coefficients; a bit value calculation circuit that calculates, for each of the at least two bits, an energy change of the Ising model that occurs when one of the at least two bits changes, based on the corresponding one of the n weight coefficient groups, a value of an updated bit that has been updated among all the bits, and first identification information that identifies the updated bit, determines whether to accept updating about each of the at least two bits based on a magnitude relationship between a thermal excitation energy determined based on a random number and the temperature parameter and the energy change, and outputs flag information that indicates a determination result of whether to accept the updating and an updated value of an accepted bit whose update has been accepted among the at least two bits; and a first selection circuit that selects one accepted bit based on the flag information and outputs a state signal that includes the flag information about the one accepted bit selected, the updated value, and second identification information that identifies the one accepted bit selected, wherein each of the n optimization apparatuses outputs the state signal based on the corresponding one of the n weight coefficient groups that differs among the n optimization apparatuses, and wherein an output terminal of the first selection circuit of each of the n optimization apparatuses is connected to any of plurality of input terminals of the second selection circuit and the second selection circuit determines the updated bit based on the flag information included in the state signal outputted by the first selection circuit of each of the n optimization apparatuses and supplies the value of the updated bit and the first identification information that identifies the updated bit to the each of the n optimization apparatuses.

* * * * *